United States Patent Office 3,646,160
Patented Feb. 29, 1972

3,646,160
POLYESTERS CONTAINING TERTIARY
NITROGEN ATOMS
Erich Eimers, Krefeld, and Hans Rudolph and Werner Kloker, Krefeld-Bockum, Germany, assignors to Farbenfabriken Bayer Aktiengesellschaft, Leverkusen, Germany
No Drawing. Filed Aug. 18, 1970, Ser. No. 64,822
Claims priority, application Germany, Aug. 29, 1969, P 19 43 954.4
Int. Cl. C08f 21/02
U.S. Cl. 260—864          3 Claims

ABSTRACT OF THE DISCLOSURE

The invention relates to novel linear polyesters containing hydroxy end groups and an N,N-bis-(β-sec.hydroxyalkyl)-p-alkylphenylamine and certain dicarboxylic acids condensed therein. These novel polyesters are useful as accelerators for mixtures of unsaturated polyesters and copolymerizable monomers which harden at room temperature after the addition of a diacyl peroxide catalyst.

---

The invention provides polyesters containing tertiary nitrogen atoms, of formula

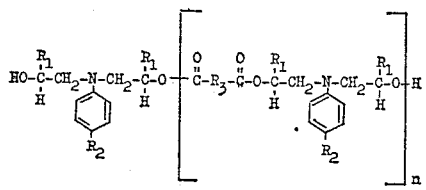

(1)

wherein $R_1$ denotes the methyl or ethyl group,
$R_2$ denotes an alkyl group with 1 to 6 carbon atoms,
$R_3$ denotes a saturated, straight-chain or branched, alkylene group with 4 to 12 carbon atoms, or a saturated cycloalkylene group or an arylene group of which the dicarboxylic acids do not form cyclic anhydrides, and
$n$ denotes an integer from 1 to 100.

The invention further provides a curable resin composition comprising an unsaturated polyester dissolved in a monomer copolymerizable therewith and 0.1 to 5 percent by weight of a polyester of the invention as a curing accelerator. These compositions are curable without heat applying by the further addition of diacyl peroxide.

It is known from the U.S. Patent 2,812,313 to react tertiary amines of formula

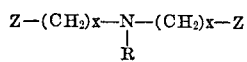

wherein

R denotes a phenylene radical which is optionally akyl-substituted, preferably methyl-substituted, in the p-position,
Z optionally denotes a hydroxyl group and
$x$ denotes an integer from 1 to 6, preferably 2.

with a dicarboxylic acid and preferably phthalic anhydride to give a polyester, and also to add this as a cure accelerator to unsaturated polyester resin compositions. The polyesters of the present invention differ from these polyesters, obtainable according to said patent, in four respects: The end groups must be hydroxyl groups, the alkyl groups on the nitrogen carry a secondary hydroxyl group in the β-position to the amino group, the substituents of the phenylene radicals located in the p-position to the nitrogen atom are restricted to lower alkyl radicals, and the dicarboxylic acids used for the manufacture of the polyesters are restricted to those in which the radical linking the two carboxyl groups to one another corresponds to the radical $R_3$ of the above formula, with straight-chain or branched alkylene groups with 4 to 12 carbon atoms being preferred.

The new polyesters have the advantage compared with those known from the patent mentioned above that when added as curing accelerators to unsaturated polyester resin mixtures as described in said patent they impart a high reactivity to the polyester compositions after addition of a diacyl peroxide, which remains largely constant even after prolonged storage of the mixtures prior to the addition of the peroxide, but above all that the cured products hardly discolour, in particular even on ageing.

The new polyesters can be manufactured by polycondensation of suitable dicarboxylic acids of the Formula 2

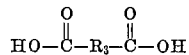

with a greater or less molar excess of a tertiary amine of formula

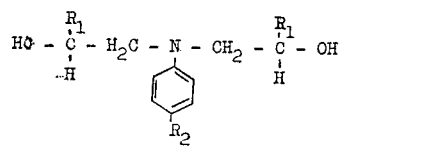

(3)

with heating, optionally with the addition of esterification catalysts and with inert gas being passed through.

A greater said excess of the tertiary amine is as lower as the value of $n$ of Formula 1 and vice versa. Suitable excesses are, for example, from 100 to about 1 and preferable from about 50 to about 10 mol percent.

Amines which correspond to the above formula are, for example, N-bis-(β-hydroxypropyl)-p-toluidine, N-bis-(β-hydroxypropyl)-p-tert.butylaniline and N-bis-(β-hydroxybutyl)-p-ethylaniline.

Suitable dicarboxylic acids are, for example, adipic acid, pimelic acid, sebacic acid, cyclohexane-1,4-dicarboxylic acid, cyclohexane-1,2-trans-dicarboxylic acid, isophthalic acid and terephthalic acid.

The table which follows indicates the effect of adding various nitrogen-containing polyesters (1,2,3 and 4) to two different polyester casting resins after adding 3% by weight of benzoyl peroxide paste in each case. Accelerator 1 denotes the known polycondensation product from 0.78 mol equivalent of phthalic anhydride and 1 mol equivalent of N-bis-(β-hydroxyethyl) - p - toluidine, and accelerator 3 denotes the polycondensation product from 0.78 mol equivalent of adipic acid and again 1 mol equivalent of N-bis-(β-hydroxyethyl)-p-toluidine, and accelerator 3 denotes the polycondensation product of 1 mol equivalent of adipic acid and again 1 mol equivalent of N-bis-(β-hydroxyethyl)-p-toluidine. These accelerators do not correspond to the invention; only accelerator 4-corresponds to the invention; it is the condensation product from 0.78 mol equivalent of adipic acid and 1 mol equivalent of N-bis-(β-hydroxypropyl)-p-toluidine. Each of these polyesters has an acid number of about 10, is stabilised by adding 0.1 percent by weight of hydroquinone, and is dissolved in styrene at 90 to 100° C. to give a solution of 70 percent by weight solids content.

The polyester casting resin A is a 69 percent by weight solution of a polyester of acid number 32 from 5421 parts by weight of phthalic anhydride, 3210 parts by weight of maleic anhydride and 5616 parts by weight of 1,2-propylene glycol, in styrene, having a viscosity of 3000 cp. at 20° C., and stabilised by adding 0.009 percent by weight of toluhydroquinone and 20 p.p.m. of copper naphthenate.

The polyester casting resin B is a 65 percent by weight solution of a polyester of acid number 23 from 3292 parts by weight of phthalic anhydride, 3270 parts by weight of maleic anhydride and 4438 parts by weight of 1,2-propylene glycol in styrene, having a viscosity of 1100 cp. at 20° C., stabilised by the addition of 0.025 percent by weight of hydroquinone.

After weathering the curing products in the Weatherometer, the samples with accelerators 1 and 2 were light brown after 100 hours and red-brown after 250 hours, whilst the samples with accelerator 4 barely showed a yellowish discolouration after 100 hours and only a weak yellowish discolouration after 250 hours.

| Accelerator | Amount of 70% strength styrene solution added, percent | N percent in the casting resin solution | Immediate | | After 1 week | | After 2 weeks | | After 4 weeks | | Colour index of the cured moulding (iodine colour index) |
|---|---|---|---|---|---|---|---|---|---|---|---|
| | | | Gel time¹ | Curing time¹ | Gel time¹ | Curing time¹ | Gel time¹ | Curing time¹ | Gel time¹ | Curing time¹ | |
| Casting Resin A: | | | | | | | | | | | |
| 1 | 2.5 | 0.0812 | 4.5 | 8.75 | 5.5 | 6.5 | 6.5 | 11.25 | 6.5 | 11.25 | 130–160 |
| 2 | 1.2 | 0.0419 | 6.35 | 12 | 11 | 18 | 12 | 16.5 | 12 | 16.0 | 60–80 |
| 3 | 5 | 0.160 | 9.25 | 18 | Not measured | | | | 9.5 | 18.5 | approx. 100 |
| 4 | 1.2 | 0.0386 | 5.25 | 10.5 | 6 | 11.75 | 6.75 | 12.75 | 7 | 12.75 | 60–80 |
| Casting Resin B: | | | | | | | | | | | |
| 1 | 2.5 | 0.0812 | 5.25 | 10 | Not measured | | | | 8.5 | 13.0 | 130–160 |
| 2 | 1.5 | 0.0525 | 7.0 | 11.5 | 8.5 | 13 | 9.75 | 15.3 | 10.25 | 16.0 | 80–130 |
| 4 | 1.5 | 0.0483 | 5.5 | 10.0 | 5.5 | 10.75 | 6.0 | 11.0 | 6.0 | 11.0 | 60–80 |

¹ Minutes.

What we claim is:

1. A curable resin composition comprising an unsaturated polyester dissolved in a monomer copolymerizable therewith and 0.1 to 5% by weight of a polyester of the formula

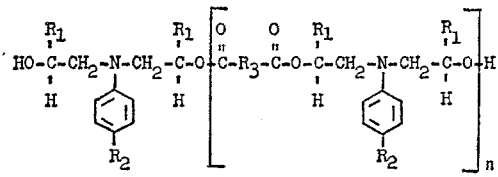

wherein $R_1$ is methyl or ethyl, $R_2$ is alkyl having from 1 to 6 carbon atoms, $R_3$ is alkylene having from 4 to 12 carbon atoms or cycloalkylene or arylene with which dicarboxylic acids do not form cyclic anhydrides and $n$ is an integer of from 1 to 100.

2. The composition of claim 1 including a diacyl peroxide.

3. A formed and cured polyester resin article based on the composition of claim 2.

References Cited

UNITED STATES PATENTS 2,812,313   11/1957   Nischk et al.

FOREIGN PATENTS 1,164,084   2/1964   Germany.

MELVIN GOLDSTEIN, Primary Examiner

U.S. Cl. X.R.

260—468 R, 475 P, 485 G, 870